US000001096H

United States Statutory Invention Registration [19]

[11] Reg. Number: H1096

Pederson

[43] Published: Aug. 4, 1992

[54] SOLID STATE SUNLIGHT READABLE ILLUMINATED DISPLAY DEVICE

[76] Inventor: David C. Pederson, 1701 Rock Ct., Freeport, Ill. 61032

[21] Appl. No.: 400,642

[22] Filed: Aug. 30, 1989

[51] Int. Cl.[5] ..... G02F 1/13

[52] U.S. Cl. ..... 359/49; 340/702; 340/765; 340/784

[58] Field of Search ..... 350/345, 338, 339; 40/448, 219; 362/84; 341/23, 31, 32; 340/712, 716, 745, 784, 781

[56] References Cited

U.S. PATENT DOCUMENTS

| | | | |
|---|---|---|---|
| 3,682,531 | 8/1972 | Jeffers | 350/156 |
| 3,957,351 | 5/1976 | Stockwell | 350/160 |
| 4,002,914 | 1/1977 | Macovski | 350/158 |
| 4,208,869 | 6/1980 | Hanaoka | 350/345 |
| 4,294,524 | 10/1981 | Stolow | 340/716 |
| 4,334,219 | 6/1982 | Paillus | 340/712 |
| 4,408,101 | 10/1983 | Brodbeck | 341/32 |
| 4,535,396 | 8/1985 | Guthrie | 362/293 |
| 4,656,466 | 4/1987 | Yoshida et al. | 340/765 |
| 4,799,050 | 1/1989 | Prince et al. | 340/784 |

FOREIGN PATENT DOCUMENTS

WO8902638 3/1989 World Int. Prop. O. .

OTHER PUBLICATIONS

Lawrence E. Tannas, Flat-Panel Display and CRT, 1985, pp. 12–13 and 16–17.

*Primary Examiner*—Bernarr E. Gregory

[57] ABSTRACT

A solid state sunlight readable, night vision compatible display device in which a legend, of which at least a portion is translucent, is back lit by a fluorescent coating on an electroluminescent light source. Under high ambient light conditions the fluorescent coating is energized primarily by ambient light transmitted through the legend. Under low ambient light conditions the fluorescent coating is energized primarily by light from the electroluminescent light source. A solid state shutter whose operation is coordinated with that of the light source is provided in front of the legent to prevent undesired message displays when the display device is "off".

11 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID STATE SUNLIGHT READABLE ILLUMINATED DISPLAY DEVICE

BACKGROUND OF THE INVENTION

The invention disclosed herein relates generally to illuminated display devices and more particularly to solid state sunlight readable, night vision compatible display devices in which ambient light energy is employed in conjunction with light energy from an artificial light source to illuminate display messages.

There are an increasing number of applications in which display of messages under high ambient light conditions, such as in direct sunlight, is required. Many of these applications also include night vision requirements in which the displayed message must not only be visible under low ambient light conditions, but must not interfere with the ability of personnel to view scenes in low ambient light. Such applications particularly include aircraft cockpit instrumentation and equipment on board marine vessels and space craft and in control towers and portable outdoor ground support systems.

A conventional approach to implementing such displays is to provide back lighting by electrical, electrochromic or other nonambient light sources. Because the back lighting must overcome the brightness of the ambient light, such light sources must be quite intense, which generally corresponds to significant power consumption. In addition, means must be provided for controlling the light intensity to meet night vision requirements.

Only a limited number of kinds of light sources are known which are capable of both producing the required intensity and meeting other practical requirements of the above noted applications. The most common kind of such light sources is a tungsten filament incandescent lamp. Such lamps, particularly when operated at high intensity, have relatively high power consumption and require dissipation of significant amounts of heat. Where a display is incorporated into a device such as a push-button switch, the display/switch can become unpleasantly hot for an operator to touch. In addition, in applications where large numbers of such displays are present in a small area, such as an aircraft cockpit, the use of large amounts of power for this purpose and the attendant requirement for dissipating large amounts of heat is undesirable.

Finally, high reliability of light sources in such applications may be very important. Although relatively long life incandescent light sources are available, incandescent sources are inherently subject to sudden failure, which may be a critical disadvantage. The elevated temperature required for high intensity operation also shortens the life of such light sources, as well as other nearby components.

Other problems which must be dealt with in displays which operate in high ambient light conditions include glare, loss of contrast and feedthrough of the display message when the display device is in an "off" status. Approaches to these problems include incorporation of various filters to absorb ambient light incident upon the face or lens of the device, and/or the incorporation of a shutter which conceals the message when the device is "off". Conventional shutters for such applications have generally been mechanical in nature, and thus involve moving parts which may be complex and difficult to assemble, and inherently suffer from reliability problems.

The applicant has overcome the previously described disadvantages of conventional sunlight readable, night vision compatible displays by providing a unique solid state design which relies on a fluorescing layer energized by either ambient light or light from an electroluminescent panel to illuminate the display.

SUMMARY OF THE INVENTION

The invention is a display device and method for producing a sunlight readable, night vision compatible display in which a message carrying member, of which at least a portion is translucent, is back lit by a fluorescent layer, the fluorescent layer being energizable by either ambient light passing through the message carrying member or light from an artificial light source. The artificial light source may be an electroluminescent panel on the opposite side of the fluorescent layer from the message carrying member. The display device may be incorporated into a switch, and visibility of the message may be controllable by controlling the status of the light source. Additional insurance against unintended visibility of the message may be provided by a shutter whose operation is coordinated with control of the artificial light source. The shutter may be a solid state twisted nematic liquid crystal shutter with crossed polarizers. The message carrying member may comprise an array of liquid crystal elements whose translucences are controllable to provide a dynamic display message.

DESCRIPTION OF THE PREFERRED EMBODIMENTS

For exemplary purposes, the applicant's invention will be described primarily in the form of a lighted display push-button switch, as might be used in an aircraft cockpit.

Figure 1:
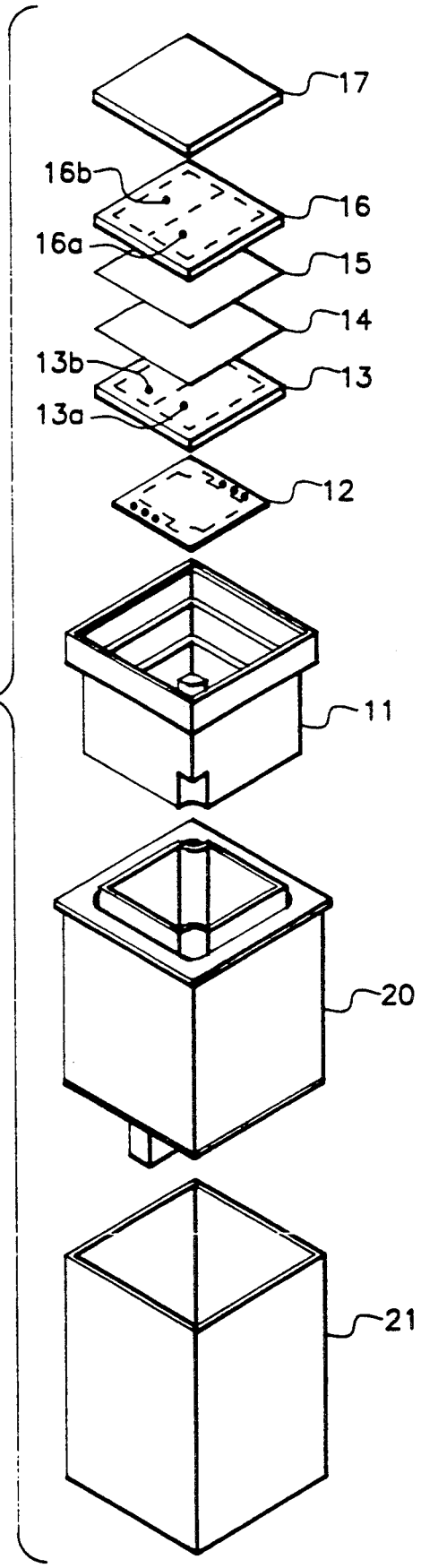
FIG. 1 is an exploded perspective view in simplified form of a push-button switch incorporating the applicant's display device.

In FIG. 1, reference numeral 11 identifies a display housing which also serves as an operator interface with the switch to be described in greater detail hereinafter. Housing 11 from inside out contains solid state electronic drive circuitry 12 for other components of the display, an electroluminescence panel light source 13, a fluorescent film 14, a film strip legend or message carrying member 15, a solid state shutter 16 and a lens 17. In a typical aircraft application, it is common to employ a two part display, of which one part may indicate a status condition or a caution condition for which some response may be desirable or required. For this purpose, electroluminescent light source 13 is shown as subdivided into two parts identified by reference numerals 13*a* and 13*b*. Correspondingly, solid state shutter 16 is subdivided into two parts identified by reference numerals 16*a* and 16*b*. Light source portion 13*a* and shutter portion 16*a* may, for example, be responsible for displaying the status or caution message, while light source portion 13*b* and shutter portion 16*b* may be responsible for indicating the action taken.

Housing 11 is carried by an actuator assembly 20 which mates with a switch device 21 including one or more switches. Switch device 21 may be a solid state device implemented with Hall effect switches, each including a Hall effect sensor with a magnet spaced therefrom. In such an implementation, actuator assembly 20 may include a vane of magnetically permeable material movable into and out of the gap between the Hall effect sensor and its associated magnet, depending on the actuation state of housing 11. Although not specifically illustrated in FIG. 1, housing 11 and actuator assembly 20 may be fitted with any of a variety of known cardioid cam and follower arrangements for maintaining housing 11 in an actuated position and releasing it from that position upon alternate depressions of the housing to provide an alternate action switching function.

Fluorescent film for layer 14 is of a material which emits visible radiation or luminescence when energized by suitable incident radiation. Film 14 is preferably a coating on the surface of electroluminescent panel 13, but is shown as a separate element for illustrative purposes.

At least portions of film strip 15 in the form of any desired characters, legend or display configuration are transparent or translucent. Solid state shutter 16, when unenergized, is substantially opaque and will not transmit visible light. Conversely, when energized, shutter 16 is capable of substantial visible light transmission. Lens 17 may carry an antireflective coating. Solid state shutter 16 may be implemented in the form of a commercially available twisted nematic liquid crystal shutter with crossed polarizers.

In operation, energization of either portion of the display causes the associated portion of light source 13 to be illuminated and opens the associated portion of shutter 16. The light from light source 13 is absorbed by fluorescent film 14, which is thereby caused to emit light which back lights the message on the associated portion of film strip legend 15. Since the associated portion of shutter 16 is open, the message will be visible to a viewer.

Under low ambient light conditions, fluorescent film 14 receives light substantially only from light source 13 whose intensity is chosen to cause fluorescent film 14 to illuminate the display with sufficient intensity for viewing under low ambient light conditions, but not with sufficient intensity to interfere with night vision performance.

Under conditions of high ambient light, such as direct sunlight, the portion of fluorescent film 14 corresponding to the open portion of shutter 16 will also receive substantial ambient light through the shutter and corresponding transparent or translucent portions of film strip legend 15. Under such conditions, ambient light will, in fact, provide the dominant energization of fluorescent film 14. This will result in film 14 emitting light which is sufficiently intense to make the message on film strip legend 15 highly visible under the high ambient light conditions.

The foregoing design and construction also offers the advantage that the electroluminescent panel is a cool light source with low energy consumption, thus avoiding uncomfortably warm operator interface surfaces and deterioration of components due to high temperature. It also avoids high power consumption and cumulative production of heat for which special dissipation provisions may be required. Finally, although the light output of and electroluminescent light source degrades with time, such a light source is not subject to sudden catastrophic failure.

Figure 2:
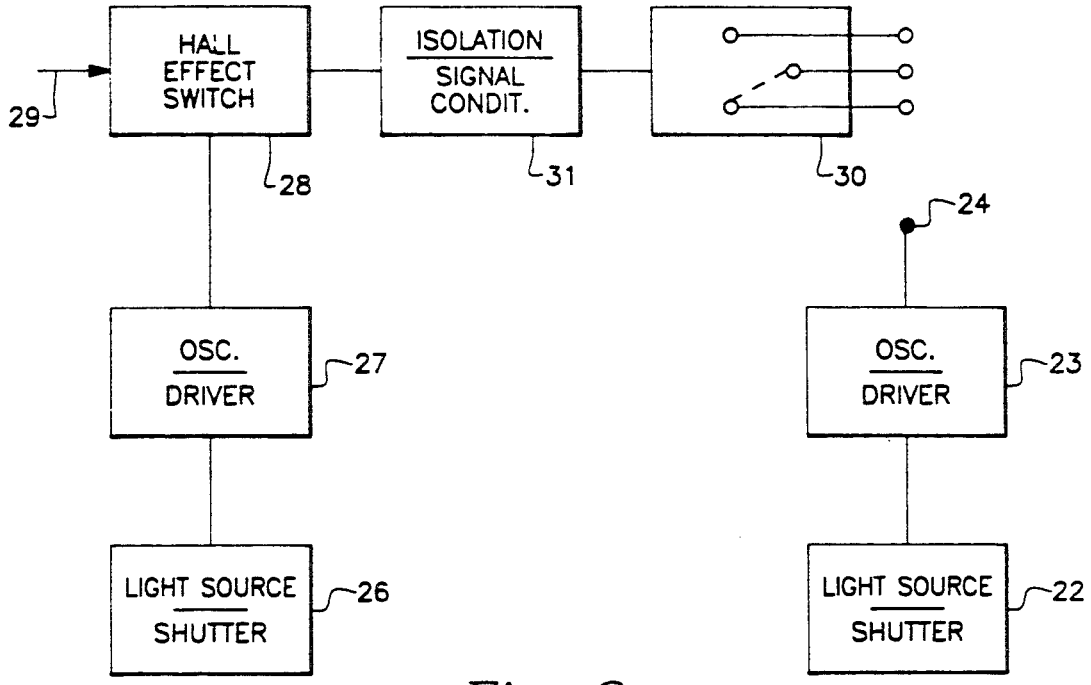
FIG. 2 is a functional block diagram of the electrical circuitry of the switch of FIG. 1.

In the circuit block diagram of FIG. 2, reference numeral 22 identifies an electroluminescent light source, such as light source portion 13*a* in FIG. 1, and an associated solid state shutter, such as shutter portion 16*a* in FIG. 1. Reference numeral 23 identifies an oscillator/driver for energizing light source/shutter 22 in response to a status or caution signal received at a terminal 24.

Reference numeral 26 identifies a light source, such as light portion 13*b* in FIG. 1, and an associated shutter, such as shutter portion 16*b* in FIG. 1. Reference numeral 27 identifies an oscillator/driver for energizing light source/shutter 26 in response to an electrical signal received from a switch 28, such as the switch in FIG. 1, under the control of an operator as indicated by arrow 29. Switch 28 also provides an output which controls a solid state switch 30, shown in schematic form through suitable isolation and signal conditioning 31.

In an exemplary application, terminal 24 may receive a signal from a remote source, indicating a condition such as landing gear status or low fuel in a fuel tank. The signal received at terminal 24, through oscillator/-driver 23, energizes status/caution display 22, alerting the cockpit crew that some action may be required. The crew then has the opportunity to actuate switch 28 which, through isolation/signal conditioning 31, changes the status of switch 30 to lower or raise the landing gear or switch to another fuel tank. Concurrently, switch 28 energizes display 26 through oscillator/driver 27 to indicate that action has been taken.

Figure 3:
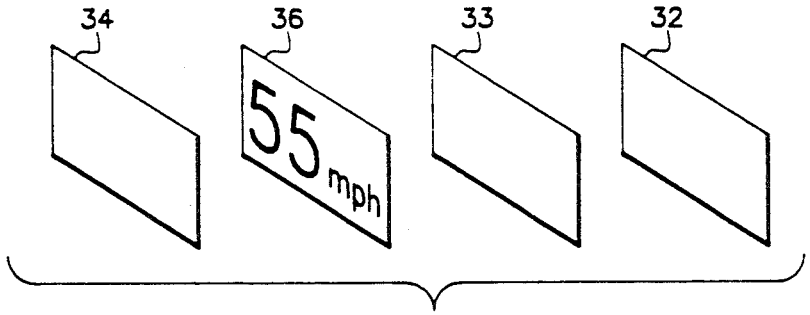
FIG. 3 is an exploded view in simplified form of a display in accordance with the applicant's invention for displaying a changing message.

FIG. 3 illustrates an embodiment of the applicant's display device which is similar to the display portion of the switch shown in FIG. 1, except that the film strip legend and shutter have been replaced by a dynamic message carrying member. As in the embodiment of FIG. 1, the display device of FIG. 3 includes an electroluminescent light source 32, a fluorescent film or coating 33 and a lens 34. However, the message carrying member and shutter, identified by reference numeral 36, are now in the form of an array of elements which can be selectively energized to alter their light transmission characteristics. Such an array can be implemented in the form of a conventional liquid crystal display.

For purposes of achieving readability in high ambient light conditions without adversely affecting night vision, message carrying member 36 functions in the same manner as film strip legend 15. However, it differs from film strip legend 15 in that its transparent or translucent portions can be varied to display a changing message. A separate shutter is not necessary since the liquid crystal display array also performs the function of shutter 16 in FIG. 1.

In accordance with the foregoing description, the applicant has provided a unique solid state sunlight readable, night vision compatible display which is low in power consumption and heat production and not subject to sudden failure. Although specific embodiments of the applicant's display device have been shown and described for illustrative purposes, a number of variations and modifications will be apparent to those of ordinary skill in the relevant arts. It is not intended that coverage be limited to the specific embodiments shown, but only by the terms of the following claims.

The embodiments of the invention in which an exclusive property or right is claimed are defined as follows:

1. A display device for displaying a message readable under both high and low ambient light conditions, comprising:

a message carrying member of which is at least a portion is translucent, said message carrying member having a first side from which the message is to be read and a second side opposite the first side;

an artificial light source located on the second side of said message carrying member; and a fluorescent film positioned on the second side of said message carrying member, said fluorescent film being positioned to receive both ambient light through the translucent portion of said message carrying member and light from said artificial light source, said fluorescent film being operable to emit light and illuminate said message carrying member when receiving the ambient light or light from said artificial light source.

2. The display device of claim 1 wherein said artificial light source is an electroluminescent panel.

3. The display device of claim 2 wherein said fluorescent film is carried on a surface of said electroluminescent panel facing said message carrying member.

4. The display device of claim 3 wherein:

said artificial light source is selectably energizable;

a shutter is provided on the first side of said message carrying member; and control means connected to said artificial light source and said shutter is provided for coordinately energizing said artificial light source and opening said shutter.

5. The display device of claim 4 wherein said shutter comprises a twisted nematic liquid crystal solid state shutter with crossed polarizers.

6. The display device of claim 5 wherein said message carrying member is a film strip.

7. The display device of claim 6 further including a lens with an antireflective coating positioned on the side of said shutter opposite said message carrying member.

8. The display device of claim 7 wherein said control means is energized by an electrical switch actuatable by operator contact with said lens.

9. The display device of claim 8 wherein said electrical switch is a solid state Hall effect switch.

10. A method of producing a visual message readable under both low and high ambient light conditions, comprising the steps of:

providing a message carrying member of which at least a portion is translucent, said message carrying member having a first side from which the message is to be read and a second side opposite the first side;

providing an artificial light source on the second side of said message carrying member; and providing a fluorescent film on the second side of said message carrying member, said fluorescent film being operable to emit light in response to either ambient light or light received from the artificial light source, whereby under high ambient light conditions the message carrying member is illuminated by said fluorescent film primarily in response to ambient light received through the translucent portion of said message carrying member, and under low ambient light conditions the message carrying member is illuminated by said fluorescent film primarily in response to light received from the artificial light source.

11. The method of claim 10 comprising the further steps of:

positioning a shutter on the first side of the message carrying member; and coordinately controlling the artificial light source and the shutter so that the shutter is open when the artificial light source is energized and the shutter is closed when the artificial light source is not energized.

* * * * *